United States Patent
Sugiyama et al.

(10) Patent No.: US 8,596,482 B2
(45) Date of Patent: Dec. 3, 2013

(54) LIQUID TANK FOR WORKING MACHINE ENGINE AND LIQUID TANK CAP

(75) Inventors: Masaki Sugiyama, Numazu (JP); Tetsuya Hasegawa, Numazu (JP)

(73) Assignee: Makita Corporation, Anjo-Shi (JP)

( * ) Notice: Subject to any disclaimer, the term of this patent is extended or adjusted under 35 U.S.C. 154(b) by 129 days.

(21) Appl. No.: 13/155,000

(22) Filed: Jun. 7, 2011

(65) Prior Publication Data
US 2012/0012587 A1    Jan. 19, 2012

(30) Foreign Application Priority Data

Jul. 15, 2010   (JP) ................................. 2010-160766
Dec. 27, 2010   (JP) ................................. 2010-290781

(51) Int. Cl.
*B65D 41/04*   (2006.01)
(52) U.S. Cl.
USPC .... 220/288; 220/88.1; 220/304; 220/DIG. 33
(58) Field of Classification Search
USPC ........................ 220/88.1, 288, 304, DIG. 33
See application file for complete search history.

(56) References Cited

U.S. PATENT DOCUMENTS

| | | | | |
|---|---|---|---|---|
| 115,127 A | * | 5/1871 | Snyder et al. ................. | 220/243 |
| 2,727,651 A | * | 12/1955 | Mickelson .................... | 220/792 |
| 4,105,135 A | * | 8/1978 | Bradshaw et al. ............ | 220/288 |
| 5,232,115 A | | 8/1993 | Bauer | |
| 6,508,374 B1 | * | 1/2003 | Griffin et al. ................. | 220/304 |
| 7,011,229 B2 | | 3/2006 | Reustle et al. | |
| 7,690,526 B1 | * | 4/2010 | Hoff .............................. | 220/304 |
| 2004/0026424 A1 | | 2/2004 | Reustle et al. | |

FOREIGN PATENT DOCUMENTS

| | | |
|---|---|---|
| EP | 0 613 801 A1 | 9/1994 |
| GB | 2 310 657 A | 9/1997 |
| JP | A-08-277938 | 10/1996 |

OTHER PUBLICATIONS

European Search Report issued in Application No. 11169369.3; Dated Oct. 29, 2012.

* cited by examiner

*Primary Examiner* — Anthony Stashick
*Assistant Examiner* — Elizabeth Volz
(74) *Attorney, Agent, or Firm* — Oliff & Berridge, PLC (57) ABSTRACT

A liquid tank cap for a working machine engine is provided. The liquid tank cap opens and closes a filling opening of a tip end portion of a refilling pipe of a liquid tank. The liquid tank cap includes an upper wall that covers the filling opening, a fitting portion that engages with an inner surface of the filling opening and protrudes from the upper wall, and a peripheral wall that covers an outer circumference of the refilling pipe in a state where the liquid tank cap is attached to the filling opening.

14 Claims, 5 Drawing Sheets

LIQUID TANK FOR WORKING MACHINE ENGINE AND LIQUID TANK CAP

FIELD OF THE INVENTION

The present invention relates to, for example, an oil filler cap attached to a fuel filler opening of a tip end of an oil filler pipe, which is mounted to an oil tank of an engine, and to a sealing structure of the oil filler cap.

BACKGROUND OF THE INVENTION

Conventionally, a structure is known that seals, in a state where an inserting-screw-type oil filler cap is attached to a tip end fuel filler opening of a receiving-screw-type oil filler pipe, a clearance and prevents oil leaks, so as to prevent entering of a foreign matter from the outside, by interposing and holding a ring-shape sealing member, made of a rubber or the like, between the oil filler cap and a tip end portion of the oil filer pipe (Japanese Patent Application Laid-Open Publication No. HEI8-277938).

In addition, when changing or refilling an oil contained in an oil tank, such an oil filler cap is removed from the tip end fuel filling opening of the oil filler pipe. In other cases, a state is maintained where the oil filler cap is attached to the tip end fuel filling opening of the oil filler pipe.

However, in many cases, an oil filler pipe is exposed to the outside. For example, in the field of a cutoff operation of an object by using a concrete cutter, a chain saw or the like, a large amount of dust and the like are generated due to the cutoff operation. Thus, a lot of dust and the like adhere to and are accumulated on an outer circumferential surface of an oil filler pipe provided to the concrete cutter or the like. Hence, in a normal state where an oil filler cap is attached to a fuel filler opening of the oil filler pipe, the oil filler cap and a sealing member can prevent the dust and the like from entering inside the oil filler pipe. However, when the oil filler cap is removed, and the fuel filler opening of the oil filler pipe is opened, the dust and the like, adhering to the periphery of the oil filler pipe, may enter inside the oil filler pipe from the fuel filler opening.

Additionally, in many cases, the oil filler cap removed from the fuel filler opening is temporarily placed on the outside ground or the like where the dust and the like are scattered. Then, after an oil is changed or filled, the oil filler cap is attached to the fuel filler opening again. Hence, there is a problem in that the dust and the like adhering to the oil filler cap enter inside the oil filler pipe.

Therefore, an object of the present invention is to provide a cap of a refilling pipe and a refilling pipe that can prevent dust and the like from adhering in the vicinity of the fuel filler opening of the oil filler pipe and the periphery of the oil filler pipe, and can prevent the dust and the like from entering inside the oil filler pipe, when closing the fuel filler opening after the oil is changed or refilled.

SUMMARY OF THE INVENTION

According to a first aspect of the present invention, there is provided a liquid tank cap for a working machine engine for opening and closing a filling opening of a tip end portion of a refilling pipe of a liquid tank, the liquid tank cap including: an upper wall that covers the filling opening; a fitting portion that engages with an inner surface of the filling opening and protrudes from the upper wall; and a peripheral wall that covers an outer circumference of the refilling pipe in a state where the liquid tank cap is attached to the filling opening.

According to a second aspect of the present invention, in the above-described liquid tank cap, the upper wall is integrally formed with the fitting portion, a sealing member for sealing the filling opening is attached to the upper wall and the fitting portion, and the peripheral wall is integrally formed with the sealing member.

According to the first and second aspects of the present invention, when the liquid tank cap is attached to the filling opening, it is possible to prevent dust and the like from adhering to the periphery of the filling opening. As a result, when the cap is removed from the filling opening, it is possible to reduce dust and the like entering the filling opening.

According to a third aspect of the present invention, in the above-described liquid tank cap, the sealing member is formed by an elastic member, a first sealing rib and a second sealing rib are formed on the sealing member, the first sealing rib protrudes toward the upper wall, the second sealing rib protrudes toward the filling opening, and a distance between the first sealing rib and the fitting portion is larger than a distance between the second sealing rib and the fitting portion.

According to the third aspect of the present invention, when the liquid tank cap is attached to the filling opening, due to the pressures applied to the first sealing rib and the second sealing rib, the peripheral wall of the sealing member of the liquid tank cap is bent toward a surface of the refilling pipe. Hence, it is possible to reduce the distance between the filling opening and the peripheral wall of the liquid tank cap. Therefore, it is possible to positively improve the dust-proof capability.

According to a fourth aspect of the present invention, in the above-described liquid tank cap, the peripheral wall protrudes farther than the fitting portion.

According to the fourth aspect of the present invention, even when the liquid tank cap is removed from the filling opening, and temporarily placed on the outside ground or the like, it is possible to prevent an inner side portion of the liquid tank cap, such as the fitting portion, from being contaminated by dust, gravel, and the like.

Hence, even when the liquid tank cap temporarily placed on the ground or the like is attached again to the filling opening, since dust and the like are not adhering to the fitting portion and the like, it is possible to keep the filling opening clean.

Further, even when the filling opening and the fitting portion of the inner side portion of the liquid tank cap are separated from each other during the removal of the liquid tank cap, at that time point, the peripheral wall having a long skirt is provided in the periphery of the refilling pipe. Hence, it is possible to prevent a sudden detachment of the liquid tank cap.

According to a fifth aspect of the present invention, in the above-described liquid tank cap, a protrusion, contacting the refilling pipe, is formed on an inner circumference of the peripheral wall.

According to the fifth aspect of the present invention, when the liquid tank cap is attached to the filling opening, it is possible to prevent dust and the like from entering a space between the peripheral wall of the liquid tank cap and the periphery of the refilling pipe.

According to a sixth aspect of the present invention, in the above-described liquid tank cap, an inserting screw is formed on an outer circumference of the fitting portion, and the inserting screw engages with a receiving screw formed on an inner surface of the filling opening.

According to the sixth aspect of the present invention, it is possible to more positively attach the liquid tank cap to the refilling pipe.

In addition, since the inserting screw is formed on the outer circumference surface of the fitting portion, when removing the liquid tank cap from the refilling pipe, the sealing member is caught by a screw thread of the inserting screw. Hence, it is possible for the sealing member to more positively move with the liquid tank cap, without being detached from the liquid tank cap.

According to a seventh aspect of the present invention, in the above-described liquid tank cap, the upper wall, the fitting portion, and the peripheral wall are integrally formed, and a sealing member for sealing the filling opening is attached to the upper wall of an inner side of the peripheral wall.

According to the seventh aspect of the present invention, when the liquid tank cap is attached to the filling opening, it is possible to prevent dust and the like from adhering to the periphery of the filling opening. As a result, when the liquid tank cap is removed from the filling opening, it is possible to reduce dust and the like entering the filling opening.

According to an eighth aspect of the present invention, there is provided a liquid tank for a working machine engine including the above-mentioned liquid tank cap, wherein the refilling pipe partially includes a tapered portion whose tube diameter is reduced toward the filling opening, and in a state where the liquid tank cap is attached to the filling opening, the peripheral wall contacts the tapered portion.

According to the eighth aspect of the present invention, when removing the liquid tank cap from the filling opening, it is possible to prevent the peripheral wall and the refilling pipe from contacting to each other. Therefore, it is possible to prevent the detaching of the sealing member from the liquid tank cap.

According to an embodiment of the present invention, when the liquid tank cap is attached to the filling opening, it is possible to prevent dust and the like from adhering in the vicinity of a tip end of the refilling pipe and the periphery of the refilling pipe. Hence, even when the liquid tank cap is removed when refilling an oil or the like, it is possible to reduce dust and the like entering inside the filling pipe.

Additionally, even when the liquid tank cap is removed from the filling opening and temporarily placed on the outside ground or the like where dust, gravel and the like are scattered, it is possible to prevent an inside portion of the liquid tank cap, such as a fitting portion or the like, from being contaminated by the dust and the like. Moreover, even when the liquid tank cap temporarily placed on the ground or the like is attached again to the filling opening, since the dust and the like are not adhering to the fitting portion and the like, it is possible to keep the filling opening clean.

DETAILED DESCRIPTION OF THE PREFERRED EMBODIMENTS

The present invention is applied to a four-stroke engine mounted on a working machine used in a field where a lot of dust and the like are generated, especially, a working machine for a cutoff operation of an object, such as a concrete cutter, a chain saw or the like. Hereinafter, a detailed description is given of embodiments of the present invention with reference to the drawings.

Figure 1:
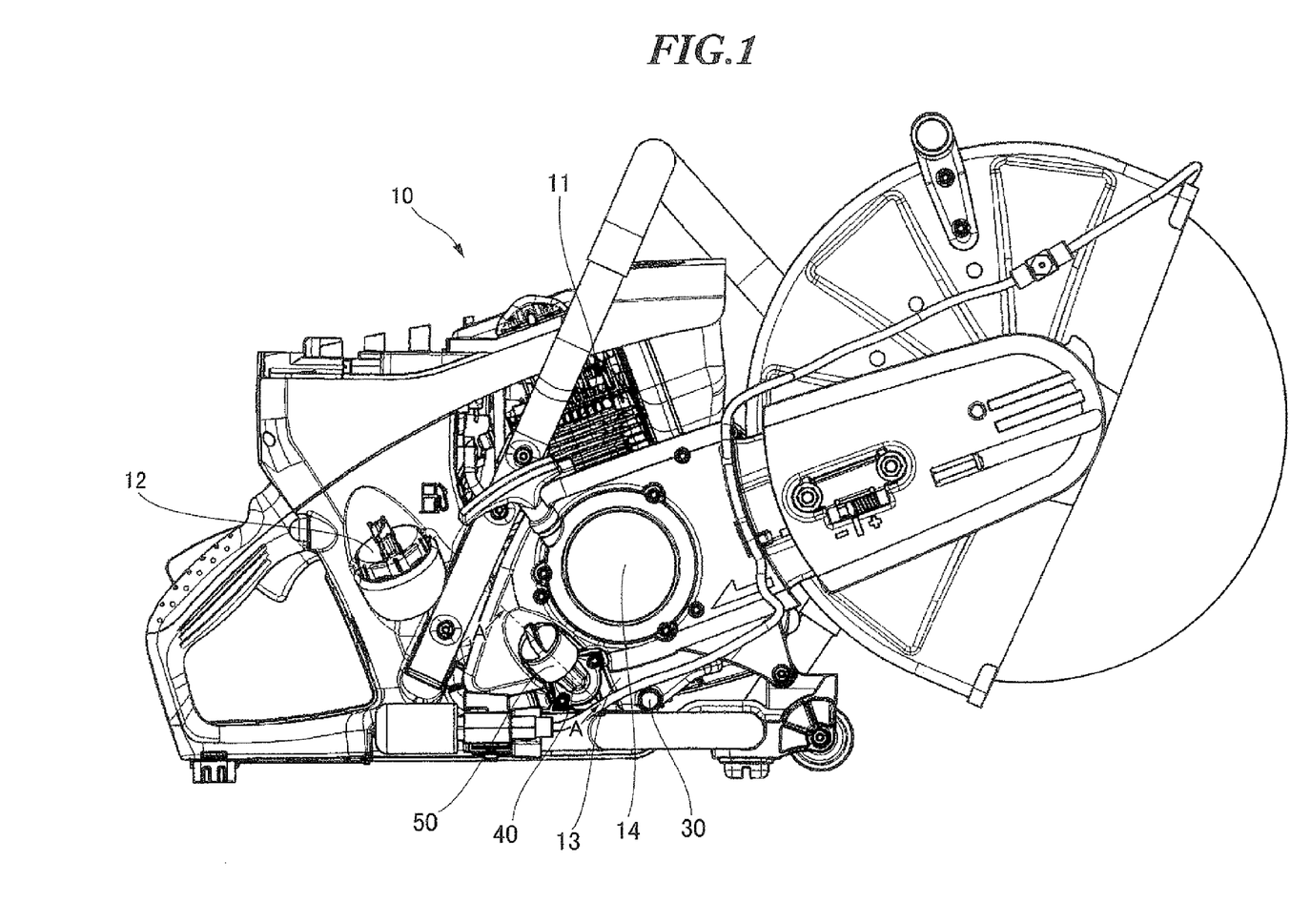
FIG. 1 is an exemplary side view showing an outer appearance of a concrete cutter to which an embodiment of the present invention is applied.

FIG. 1 shows an outer appearance of a concrete cutter to which an embodiment of the present invention is applied. A four-stroke engine 10 includes an engine body 11, a fuel cap 12 attached to a fuel filler opening of a fuel tank, an oil tank 13 containing a lubricating oil, and a recoil starter 14 for starting an engine.

Additionally, an oil filler pipe 40 is provided below the recoil starter 14, and an oil filler cap 50 is attached to a tip end portion of the oil filler pipe 40.

Here, the oil filler pipe 40 shown in FIG. 1 is formed into a tube shape, and is integrally connected and fixed, by a screw or the like, to the oil tank 13, such that the oil filler pipe 40 communicates with the inside of the oil tank 13.

In addition, as shown in FIG. 1, a drain opening 30 for discharging a lubricating oil EO from the engine body 11 is formed below a connecting part between the oil tank 13 and the oil filler pipe 40. The drain opening 30 is provided in the oil tank 13. Normally, the drain opening 30 is closed by a bolt.

Figure 2:
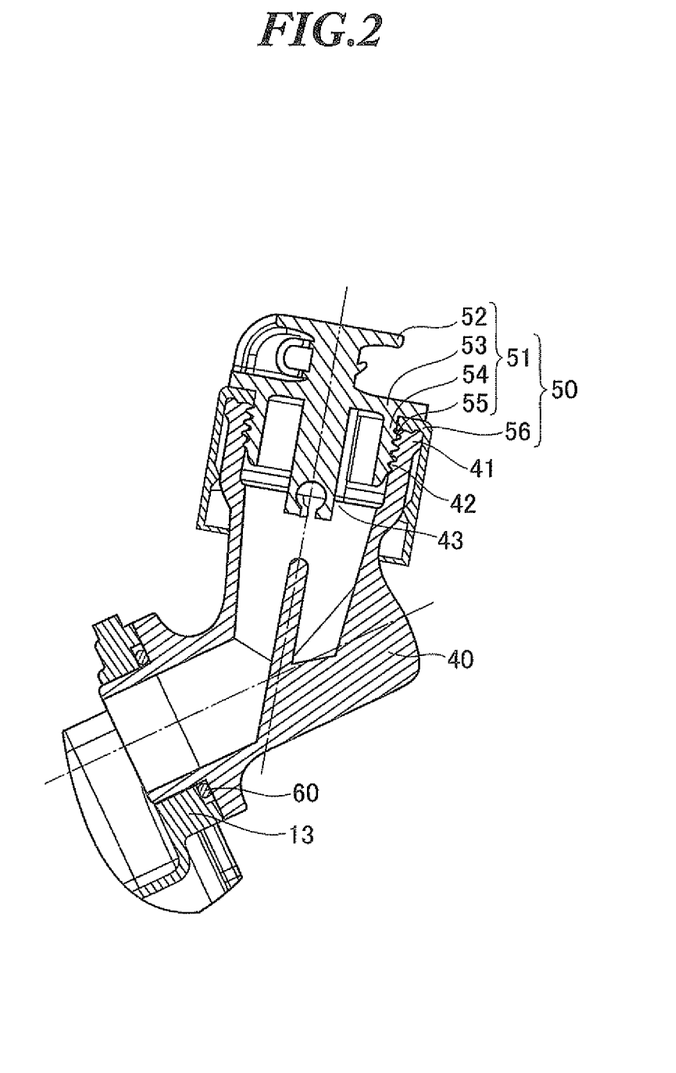
FIG. 2 is an exemplary cross-sectional view taken along the line A-A shown in FIG. 1 and showing an exemplary mounting state of an oil filler pipe.

Here, referring to FIG. 2, a description is given of the oil filler pipe 40 and the oil filler cap 50 that is attached to the oil filler pipe 40 in this embodiment.

FIG. 2 is an exemplary cross-sectional view taken along the line A-A shown in FIG. 1, and is an exemplary diagram showing a state where the oil filler pipe 40 is fixed to the oil tank 13 via a packing member 60, and the oil filler cap 50 is attached to a tip end portion 41 so as to close a filling opening 43.

As shown in FIG. 2, the oil filler cap 50 is formed by a cap body 51 and a sealing member 56. The cap body 51 is formed by a finger holding member 52, an upper wall portion 53, a fitting portion 54 inserted into the filling opening 43, and an inserting screw portion 55 formed on an outer surface portion of the fitting portion 54. Additionally, the sealing member 56 is made of a rubber, and is held between the upper wall portion 53 and the inserting screw portion 55 by the elasticity of the sealing member 56.

When an operator rotates the finger holding member 52, the inserting screw portion 55 is engaged with a receiving screw portion 42 formed on an inner circumference surface of the oil filler pipe 40, and the oil filler cap 50 is attached to the tip end portion 41 of the oil filler pipe 40.

Additionally, in this attached state, by interposing the sealing member 56 between the tip end portion 41 and the upper wall portion 53 of the cap body 51, a clearance is closed.

Figure 3:
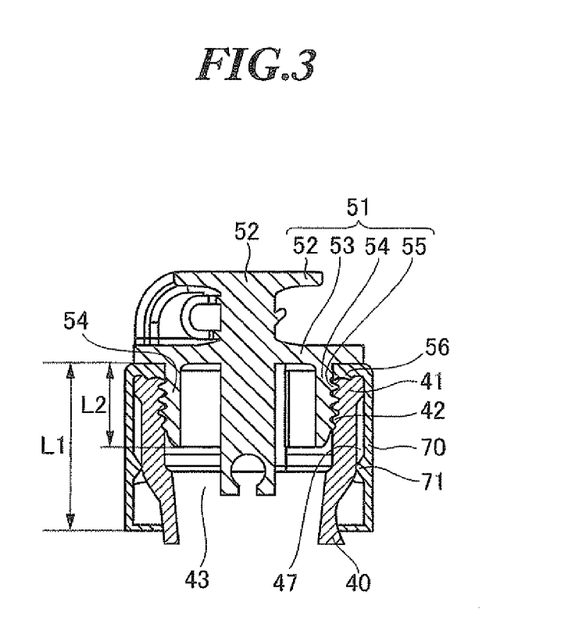
FIG. 3 is an exemplary enlarged view of an oil filler cap attached to an end portion of the oil filler pipe.

Next, referring to FIG. 3, a detailed description is given of an exemplary structure of the oil filler cap 50.

As shown in FIG. 3, the sealing member 56 closes a clearance by being interposed between the tip end portion 41 of the oil filler pipe 40 and the upper wall portion 53 of the cap body 51.

Further, even when the engaged state between the inserting screw portion 55 and the receiving screw portion 42 is being released, that is, even when the upper wall portion 53 is departed from the tip end portion 41 by a rotation operation of the finger holding member 52, since the sealing member 56 is caught by a screw thread (protrusion) of the inserting screw portion 55, the sealing member 56 is not detached from the oil filler cap 50, and the sealing member 56 moves together with the oil filler cap 50.

Further, in this embodiment, the sealing member 56 includes a peripheral wall 70. Since the peripheral wall 70 is provided, in the state where the oil filler cap 50 is attached to the tip end portion 41, the outer circumference side of the oil filler pipe 40 is covered in the vicinity of the tip end portion 41.

Hence, when the oil filler cap 50 is attached to the tip end portion 41, it is possible to prevent dust and the like from adhering in the vicinity of the tip end portion 41 and to the periphery of the oil filler pipe 40. As a result, when the oil filler cap 50 is removed for changing or filling an oil, it is possible to reduce the dust and the like entering inside the oil filler pipe 40 through the filling opening 43.

Further, in this embodiment, as shown in FIG. 3, a protrusion 71, which protrudes toward an outer circumference surface of the oil filler pipe 40, is provided on an inner circumference surface of the peripheral wall 70. Hence, it is possible to prevent dust and the like from entering inside a space 47 formed between the inner circumference surface of the peripheral wall 70 and the outer circumference surface of the oil filler pipe 40.

In addition, as shown in FIG. 3, assuming the position of the upper wall portion 53 as a standard, by making a length L1 of the peripheral wall 70 longer than a length L2 of the fitting portion 54, even when the oil filler cap 50 is removed from the tip end portion 41 of the oil filler pipe 40, and the oil filler cap 50 is temporarily placed on the outside ground or the like, it is possible to prevent portions entering inside the oil filler pipe 40, such as the fitting portion 54 and the inserting screw portion 55, from being contaminated by gravel or the like.

Hence, even when the oil filler cap 50 temporarily placed on the ground or the like is attached again to the filling opening 43, dust and the like do not adhere to the fitting portion 54 and inserting screw portion 55. Therefore, it is possible to keep the filling opening 43 clean.

Moreover, even when the engagement is released between the inserting screw portion 55 of an inner side of the oil filler cap 50 and the receiving screw portion 42 of the oil filler pipe 40, while removing the oil filler cap 50 by the rotation operation of the finger holding member 52, at that point, the tubular peripheral wall 70 having a long skirt is provided around the oil filler pipe 40. Therefore, it is possible to prevent a sudden detachment of the oil filler cap 50.

Figure 4:
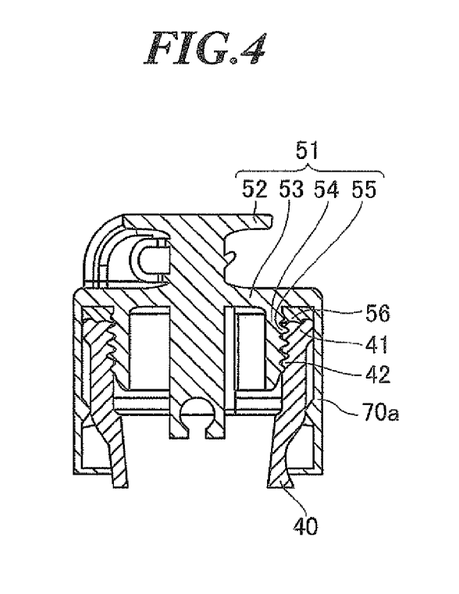
FIG. 4 is an exemplary diagram showing a modification of the present invention.

Further, FIG. 4 is an exemplary diagram showing a modification of the embodiment shown in FIG. 3, and showing an exemplary structure where a peripheral wall 70a, covering the outer circumference side of the oil filler pipe 40, is integrally formed with the cap body 51.

Also in this case, the operation and effects obtained by including the peripheral wall 70a shown in FIG. 4 are similar to those obtained by including the peripheral wall 70 shown in FIG. 3.

Additionally, in FIG. 4, the upper wall portion 53, the fitting portion 54, and the peripheral wall 70a are integrally formed. The ring-shaped sealing member 56 is provided on a surface of the upper wall portion 53 and between the fitting portion 54 and the peripheral wall 70a, and closes the clearance between the tip end portion 41 and the upper wall portion 53.

Figure 5:
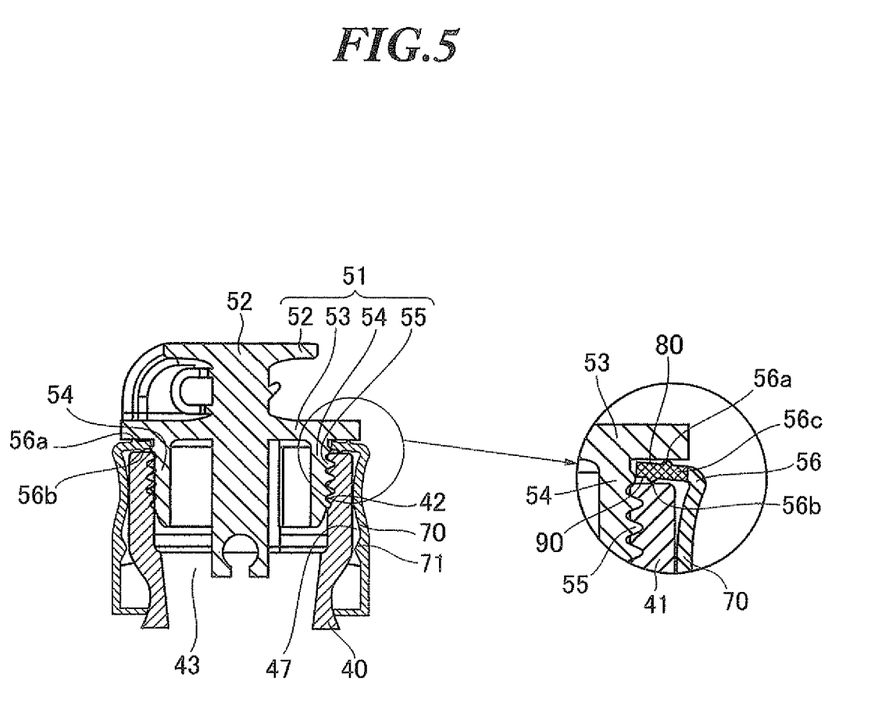
FIG. 5 is another exemplary diagram showing another modification of the present invention.

Further, FIG. 5 is an exemplary diagram showing a further modification of the embodiment shown in FIG. 3, and showing an exemplary structure where sealing ribs (56a and 56b in FIG. 5) are formed on the sealing member 56.

Specifically, as shown in FIG. 5, the sealing member 56 is formed by the peripheral wall 70 and a sealing portion 56c, which is interposed between the tip end portion 41 of the oil filler pipe 40 and the upper wall portion 53 of the cap body 51.

Additionally, the sealing portion 56c is provided with a first sealing rib 56a, protruding toward the upper wall portion 53, on an attaching surface 80 that faces the upper wall portion 53, and a second sealing rib 56b, protruding toward the tip end portion 41, on a contacting surface 90 that faces the tip end portion 41.

In addition, the first sealing rib 56a and the second sealing rib 56b are circular shapes on surfaces of the sealing member 56. The diameter of the first sealing rib 56a is formed to be larger than the diameter of the second sealing rib 56b.

Hence, when the oil filler cap 50 is attached to the filling opening 43, due to the simultaneous action of the pressure applied from the upper wall portion 53 to the first sealing rib 56a and the pressure applied from the tip end portion 41 to the second sealing rib 56b, as shown in FIG. 5, the outer portion of the sealing member 56 between the upper wall portion 53 and tip end portion 41 is, the further the portion is bent or inclined toward the tip end portion 41.

As a result, the peripheral wall 70 of the sealing member 56 is bent toward the outer circumference surface of the oil filler pipe 40. Hence, it is possible to more positively prevent dust and the like from entering between the peripheral wall 70 and the oil filler pipe 40. Therefore, it is possible to improve the sealing property between the filling opening 43 and the oil filler cap 50.

In this case, it is preferable that the sealing member 56 is formed by an elastic member, such as an acrylic rubber, a fluorine-contained rubber, or a nitrile rubber.

Figure 6:
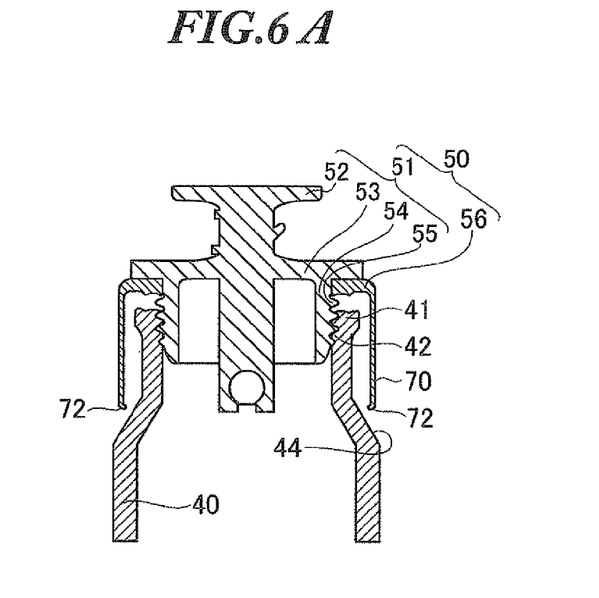
FIG. 6A is an exemplary enlarged view of the oil filler cap attached to the tip end portion of the oil filler pipe in another embodiment of the present invention.
FIG. 6B is an exemplary enlarged view of the oil filler cap attached to the tip end portion of the oil filler pipe in still another embodiment of the present invention.

Next, referring to FIG. 6A and FIG. 6B, a description is given of another modification of the present invention.

FIG. 6A shows an exemplary structure where the oil filler pipe 40 partially includes a tapered portion 44, whose tube diameter is formed to be reduced from the oil tank 13 toward the tip end portion 41, and an exemplary structure where the inner circumference surface of the peripheral wall 70 does not contact the outer circumference surface of the oil filler pipe 40, while the inserting screw portion 55 and the receiving screw portion 42 are being engaged with or released from each other.

Additionally, FIG. 6B shows a state where, as a result of an engaging operation between the inserting screw portion 55 and the receiving screw portion 42, an end portion 72 of the peripheral wall 70 touches a surface of the tapered portion 44.

With such a structure, when the inserting screw portion 55 is engaged with the receiving screw portion 42 by the rotation operation of the finger holding member 52, the end portion 72 of the peripheral wall 70 touches the surface of the tapered portion 44. Therefore, it is possible to prevent dust and the like from entering the inside of the space 47, which is formed between the outer circumference surface of the oil filler pipe 40 and the peripheral wall 70.

Additionally, as shown in FIG. 6A and FIG. 6B, by forming the tube diameter of the tip end portion 41 of the oil filler pipe 40 to be smaller than the inner diameter of the peripheral wall 70 of the sealing member 56, at the time of the engaging or releasing operation, the peripheral wall 70 does not contact the tip end portion 41 and the outer circumference surface of the oil filler pipe 40. Thus, the engaging operation is smoothly performed since no friction occurs between the peripheral wall 70 and the tip end portion 41 and between the peripheral wall 70 and the outer circumference surface of the oil filler pipe 40. Therefore, at the time of the releasing operation, the sealing member 56 is hardly detached from the oil filler cap 50.

Further, the above-described protrusion 71 (not shown) may be provided at the position of the end portion 72 of the peripheral wall 70 shown in FIG. 6A and FIG. 6B. In this case, as a result of the engaging operation between the inserting screw portion 55 and receiving screw portion 42, the protrusion 71 touches the surface of the tapered portion 44. Therefore, it is possible to prevent dust and the like from entering inside the space 47.

In addition, as shown in FIG. 6A and FIG. 6B, by forming the tube diameter of the tip end portion 41 of the oil filler pipe 40 to be smaller than the inner diameter of the peripheral wall 70 of the sealing member 56, at the time of the engaging or releasing operation, the peripheral wall 70, such as the protrusion 71, does not contact the tip end portion 41 and the outer circumference surface of the oil filler pipe 40. Thus, the engaging operation is smoothly performed since there no friction occurs between the peripheral wall 70 and the tip end portion 41 and between the peripheral wall 70 and the outer circumference surface of the oil filler pipe 40. Therefore, the sealing member 56 is hardly detached from the oil filler cap 50.

In addition, the above-described first sealing rib and the second sealing rib (not shown) may be formed on the sealing member 56 shown in FIG. 6A and FIG. 6B. In this case, due to the simultaneous action of the pressure applied from the upper wall portion 53 to the first sealing rib and the pressure applied from the tip end portion 41 to the second sealing rib, as mentioned above, the peripheral wall 70 is bent toward the outer circumference surface of the oil filler pipe 40. Hence, it is possible to reduce the distance between the filling opening and the peripheral wall of the cap. Therefore, it is possible to more positively improve the dust-proof capability.

In the structure shown in FIG. 6A and FIG. 6B, the peripheral wall 70, covering the outer circumference side of the oil filler pipe 40, is integrally formed with sealing member 56. However, the peripheral wall 70 may be integrally formed with the cap body 51.

As mentioned above, according to one embodiment of the present invention, in the state where the oil filler cap 50 is attached to the oil filler pipe 40, it is possible to prevent dust and the like from adhering in the vicinity of the tip end portion 41 of the oil filler pipe 40. As a result, even when the oil filler cap 50 is removed at the time of filling the oil, it is possible to reduce dust and the like entering inside the oil filler pipe 40.

Additionally, the length of the peripheral wall 70 is longer than the length of the fitting portion 54. Hence, even when the oil filler cap 50 is removed from the tip end portion 41 of the oil filler pipe 40, and the oil filler cap 50 is temporarily placed on the outside ground or the like, it is possible to prevent the inside of the oil filler pipe 40, such as the fitting portion 54 and the inserting screw portion 55, from being contaminated by dust and the like, which are scattered on the ground.

Further, even when the oil filler cap 50 temporarily placed on the ground or the like is attached again to the filling opening 43, dust and the like are not adhering to the fitting portion 54 and/or the inserting screw portion 55. Hence, it is possible to keep the filling opening 43 clean.

In addition, the description is given of the case where the present invention is applied to a fuel filler opening of an oil tank. However, the present invention is not limited to the above-described embodiments, and can be applied to a fuel filler opening of a fuel tank of an engine, or a liquid supply opening of a general container.

Further, the description is given of the structure where the fitting portion to be inserted in the filling opening includes the screw portion for engaging with the inner circumferential surface of the oil filler pipe. However, the present invention is not limited to such an embodiment, and may be applied to a structure where, without forming the screw portion, the fitting portion engages with the oil filler pipe by press-fitting the fitting portion to the filling opening.

The invention claimed is:

1. A liquid tank cap for a working machine engine for opening and closing a filling opening of a tip end portion of a refilling pipe of a liquid tank, the liquid tank cap comprising:
    an upper wall that covers the filling opening;
    a fitting portion that engages with an inner surface of the filling opening and protrudes from the upper wall; and
    an elastic member that includes a peripheral wall that covers an outer circumference of the refilling pipe in a state where the liquid tank cap is attached to the filling opening, wherein:
    the upper wall is integrally formed with the fitting portion;
    the elastic member includes a sealing member for sealing the filling opening is attached to the upper wall and the fitting portion; and
    the elastic member covers an outer circumference of the refilling pipe by the peripheral wall, and seals the filling opening by the sealing member.

2. A liquid tank for a working machine engine including the liquid tank cap according to claim 1, wherein the refilling pipe partially includes a tapered portion whose tube diameter is reduced toward the filling opening, and in a state where the liquid tank cap is attached to the filling opening, the peripheral wall contacts the tapered portion.

3. The liquid tank cap according to claim 1, wherein an inserting screw is formed on an outer circumference surface of the fitting portion, and the inserting screw engages with a receiving screw formed on an inner circumference surface of the filling opening.

4. The liquid tank cap according to claim 1, wherein the upper wall, the fitting portion, and the peripheral wall are integrally formed, and the sealing member for sealing the filling opening is attached to the upper wall of an inner side of the peripheral wall.

5. The liquid tank cap according to claim 1, wherein,
    a first sealing rib and a second sealing rib are formed on the sealing member,
    the first sealing rib protrudes toward the upper wall,
    the second sealing rib protrudes toward the filling opening, and
    a distance between the first sealing rib and the fitting portion is larger than a distance between the second sealing rib and the fitting portion.

6. The liquid tank cap according to claim 5, wherein an inserting screw is formed on an outer circumference surface of the fitting portion, and the inserting screw engages with a receiving screw formed on an inner circumference surface of the filling opening.

7. The liquid tank cap according to claim 1, wherein the peripheral wall protrudes along the fitting portion farther than the fitting portion.

8. The liquid tank cap according to claim 7, wherein an inserting screw is formed on an outer circumference surface of the fitting portion, and the inserting screw engages with a receiving screw formed on an inner circumference surface of the filling opening.

9. The liquid tank cap according to claim 1, wherein a protrusion, contacting the refilling pipe, is formed on an inner circumference of the peripheral wall.

10. A liquid tank for a working machine engine including the liquid tank cap according to claim 9, wherein the refilling pipe partially includes a tapered portion whose tube diameter is reduced toward the filling opening, and in a state where the liquid tank cap is attached to the filling opening, the peripheral wall contacts the tapered portion.

11. A liquid tank cap for a working machine engine for opening and closing a filling opening of a tip end portion of a refilling pipe of a liquid tank, the liquid tank cap comprising:

an upper wall that covers the filling opening;

a fitting portion that engages with an inner surface of the filling opening and protrudes from the upper wall; and a peripheral wall that covers an outer circumference of the refilling pipe in a state where the liquid tank cap is attached to the filling opening, wherein:

an inserting screw is formed on an outer circumference surface of the fitting portion, and the inserting screw engages with a receiving screw formed on an inner circumference surface of the filling opening; and the peripheral wall protrudes along the fitting portion farther than the fitting portion.

12. The liquid tank cap according to claim 11, wherein the upper wall, the fitting portion, and the peripheral wall are integrally formed, and the sealing member for sealing the filling opening is attached to the upper wall of an inner side of the peripheral wall.

13. The liquid tank cap according to claim 11, wherein a protrusion, contacting the refilling pipe, is formed on an inner circumference of the peripheral wall.

14. A liquid tank for a working machine engine including the liquid tank cap according to claim 13, wherein the refilling pipe partially includes a tapered portion whose tube diameter is reduced toward the filling opening, and in a state where the liquid tank cap is attached to the filling opening, the peripheral wall contacts the tapered portion.

* * * * *